3,451,943
REGENERATION OF A COBALT HYDRO-
GENATION CATALYST
Albert E. Ruscilli, Wheelersburg, Ohio, assignor to Standard Oil Company, Chicago, Ill., a corporation of Indiana
No Drawing. Continuation of application Ser. No. 371,102, May 28, 1964. This application Nov. 3, 1966, Ser. No. 591,924
Int. Cl. C07c 29/14; B01j 11/66
U.S. Cl. 252—420     1 Claim

ABSTRACT OF THE DISCLOSURE

An Oxo reaction carbonyl products stream is hydrogenated with a fixed bed cobalt hydrogenation catalyst until the catalyst becomes undesirably inactive, following which the catalyst is flushed with water under conditions effective for hydrolysis of organic cobalt salts causing catalyst inactivation, after which the catalyst is reduced with hydrogen to an active cobalt catalyst for further hydrogenation of the Oxo reaction carbonyl products stream.

---

This application is a continuation of Ser. No. 371,102, filed May 28, 1964, and now abandoned.

This invention relates to an improvement in the synthesis of alcohols. More particularly, it relates to a novel method for regenerating the hydrogenation catalyst used in the hydrogenation step of the Oxo process.

A detailed description of the Oxo process is available in various references, of which one example is "Higher Oxo Alcohols" by L. F. Hatch, J. Wiley & Sons, Inc. (1957). The conventional two-step production of Oxo alcohols involves a carbonylation reaction between carbon monoxide, hydrogen and an olefin feed which yields an organic products stream of carbonyl compounds. The catalyst for this first reaction is generally a metal carbonyl compound. The organic products stream is next subjected to a fixed bed hydrogenation process, in which catalytically active cobalt metal on a support may be employed as the hydrogenation catalyst. A suitable inert support is a material such as pumice. A common catalyst for the hydrogenation of the organic carbonyl compounds is about 10–40 percent by weight of cobalt on pumice. Such a metal catalyst undergoes progressive deactivation under the reaction conditions used for the hydrogenation of the carbonyl products stream, which results in a reduced yield of hydrogenation products. The reduction in yield of hydrogenation products by catalyst deactivation can be counterbalanced, to some extent, by the maintenance of progressive increases in the temperature within the hydrogenation reactor. These temperature increases are graduated in such fashion that the increase in reaction rate roughly compensates for the decrease in catalyst activity. Thus the overall rate of reaction remains relatively constant for a longer period of time than would otherwise be possible. Inevitably, however, a stage of catalyst deactivation is reached, beyond which further increases in hydrogenation temperature do not maintain constant the rate of hydrogenation to alcohol products. Instead, excessive paraffination and a rapid increase in catalyst deactivation occur. Further, the periodic increases in temperature lead to various side reactions, which produce a number of undesirable by-products within the hydrogenation reactor. These by-products are such organic compounds as esters, ketones, condensation products of aldehydes, by-product fatty acid soaps resulting from side reactions of formates, etc. Substances which are especially detrimental to the catalyst are those resulting from side reactions of formates present in the feed to the hydrogenation reactor. These contaminants in particular react with the metal hydrogenation catalyst to produce non-catalytically active compounds. Once the catalyst has undergone deactivation it is no longer useful and must be discarded, which necessitates an expensive replenishment of the catalyst in the reactor, and causes a consequent increase in the cost of producing alcohols by the Oxo process.

My invention is a novel procedure for regenerating a cobalt hydrogenation catalyst deactivated by contact with an Oxo reaction carbonyl products stream and restoring its activity for hydrogenation so that it need not be discarded after one cycle of useage.

A further object of my invention is to provide a process whereby a cobalt hydrogenation catalyst can be regenerated in situ. It is to be understood that when I refer to a cobalt hydrogenation catalyst herein, I mean a catalyst of metallic cobalt on an inert support, useful for hydrogenating an Oxo process carbonyl stream; further, my regeneration technique applies to such catalyst which has been deactivated by use for Oxo process hydrogenation, or by use in some process which causes catalyst deactivation in a way similar to the Oxo process.

These and other objects of my novel process will be obvious to those of ordinary skill in this art in light of the description set out hereinbelow.

My novel process comprises the steps of subjecting a cobalt hydrogenation catalyst, deactivated by contact with an Oxo carbonyl products stream, to water flushing, and hydrogen reduction.

The beneficial effect of water and hydrogen upon the described deactivated catalyst is believed to depend primarily upon the following reactions. The water reacts with cobalt organic acid salt to hydrolyze such salt and release the cobalt as a hydroxide, as follows:

R=hydrocarbon radical, typical of Oxo feed stock.

The cobalt hydroxide is then reduced by the hydrogen stream to produce cobalt metal upon the catalyst support, and water, as follows:

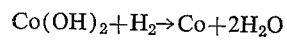

The water is removed from the catalyst bed by the hydrogen sweep and as the temperature of the catalyst is raised for catalyst reduction and activation, substantially all water is driven off. The usefulness of my process is, of course, independent of the catalyst support, since the support has no active part in the regeneration; pumice is a common support, but not the only possible support.

The pressure to be used during my novel regeneration procedure is not critical, and may be in the range of subatmospheric to the upper pressure limit of the vessel in which catalyst regeneration is effected. The pressure should, of course, be sufficient to maintain the water as a liquid during the hydrolysis step, in order that flushing action of the water over the catalyst is available. Freed carboxylic acids are removed from the reactor by flushing. I have found that suitable pressures are such as those within the range of from about 10 to about 5000 p.s.i.g., and I prefer to use a pressure of about 3000 p.s.i.g. During the water flushing of a deactivated cobalt catalyst, the pressure may be maintained with an inert gas, since hydrogen does not make any contribution to the initial hydrolysis reaction. As a matter of convenience, I prefer to simply maintain the hydrogen stream normally flowing through the hydrogenation reactor at the normal operating pressure, i.e. about 3000 p.s.i.g. This hydrogen pressure is also suitable for the reduction of cobalt hydroxide, following the hydrolysis operation.

The temperature to be used during my regeneration procedure is not critical, but should be selected so that the water during the flushing operation remains as a liquid phase. When a catalyst is regenerated in situ, it is convenient to conduct the water washing at a temperature near the normal operating temperature of the hydrogenation process; thus, when regeneration is complete, the hydrogenation of the Oxo carbonyl products stream can be commenced after the shortest possible interruption. The higher the temperature of the catalyst during regeneration, the higher the pressure required to maintain the required liquid phase. Suitable temperature and pressure relationships are familiar to those skilled in this art. Following the water flushing, the temperature can be increased to accelerate reduction of the cobalt hydroxide to metallic cobalt, and is, suitably, within the range of about 400 to 600° F., though the particular temperature is not critical, and higher or lower temperatures may be used. Of course, a higher temperature results in a more rapid reduction. I prefer to use a temperature of from about 500 to 600° F. for reducing the cobalt hydroxide to metallic cobalt.

The amount of water to be used in the flushing operation should be sufficient to wash the organic acids, freed by hydrolysis of organic cobalt salts, from the catalyst bed; this state of washing can be readily determined by testing the effluent from the reactor bed for the presence of organic acids. When no acids appear in the water effluent, the hydrolysis can be considered complete. I have found that a useful amount of water to be used in treating a catalyst containing about 20 weight percent cobalt on pumice, when the catalyst has been deactivated to such extent that a temperature of about 850° F. is necessary for 97 percent conversion of aldehyde to alcohol during hydrogenation, is from about 0.8 to about 1.0 gallon of water per pound of catalyst. A greater amount of water can, of course, be used.

The amount of hydrogen to be used during catalyst regeneration must be at least the stoichiometric amount and is suitably 1.5 or more times the stoichiometric amount necessary to convert the cobalt hydroxide to cobalt metal. I have found that convenient and satisfactory reduction can be obtained by simply maintaining the same flow of hydrogen used during the hydrogenation of the Oxo carbonyl products stream during catalyst regeneration.

A typical regeneration of a deactivated catalyst comprises about 20 weight percent cobalt on pumice, and deactivated by use for hydrogenation of an Oxo process aldehyde to alcohol, is performed as follows: The liquid feed to a hydrogenation reactor, containing about 4300 pounds of catalyst, is shut off and hydrogen is allowed to pass through the reactor until substantially all the aldehyde and alcohol in the reactor have been swept out. At this point, water is fed to the reactor at a rate of about 9 gallons per minute for 6 hours, while hydrogen pressure is used to maintain the water as liquid at a temperature of 350 to 400° F. After about 6 hours of water-washing, at which time the amount of organic acids appearing in the effluent wash water will be negligible, the water feed is stopped. The hydrogen flow is maintained through the bed for from 15 minutes to 3 hours, suitably about 1 hour, to sweep out the water, and the hydrogenation reactor temperature is raised to between 500 and 600° F. The catalyst is then reduced and activated between 500 and 600° F. for from 10 to 20 hours, suitably about 15 hours. The catalyst is then allowed to cool to a temperature around 450° F., whereupon the liquid aldehyde feed to the hydrogenator can be started, and hydrogenation commenced.

The results of regeneration of four hydrogenation catalyst beds containing about 20 weight percent of cobalt on pumice, according to the process of my invention, are tabulated below. It is apparent from the results presented in the table that the regeneration of a cobalt hydrogenation catalyst, in accordance with the process of my invention, effects a considerable reduction in the temperature necessary for conversion of Oxo process aldehyde to alcohol and thus permits the continued use of hydrogenation catalyst, which would otherwise be of no further use, because of the high temperatures necessary for reasonable reaction rates with deactivated catalyst and the accompanying undesirable by-product production.

TABLE.—REGENERATION OF 20 WEIGHT PERCENT COBALT ON PUMICE CATALYST USING WATER AND HYDROGEN

| Catalyst | Maximum hydrogenation bed temp. necessary to attain 97% conversion of aldehyde to alcohol, °F. | |
|---|---|---|
| | Before treatment | After treatment |
| 1 | 586 | 421 |
| 2 | 592 | 500 |
| 3 | 617 | 500 |
| 4 | 570 | 446 |

My novel regeneration process for deactivated cobalt hydrogenation catalyst is especially advantageous in that regeneration can be effected without removing the deactivated catalyst from the vessel used for hydrogenation in the Oxo process stream.

Having thus described my invention, what I claim is:

1. A process for hydrogenation of an Oxo reaction carbonyl products stream with a fixed bed cobalt hydrogenation catalyst and in situ regeneration of said catalyst, which comprises:
   (a) hydrogenating said Oxo reaction carbonyl products stream to convert carbonyl compounds predominantly to alcohols,
   (b) increasing the temperature for said hydrogenating to compensate for formation of deactivated catalyst, resulting from formation of organic cobalt salts, until paraffination and other side reactions reach an undesirable level,
   (c) flushing said catalyst with water under conditions of temperature and pressure which cause hydrolysis of organic cobalt salts and produce cobalt hydroxide and free organic acids, maintaining said flushing until substantially all of said free organic acids have been removed from said deactivated catalyst,
   (d) reducing said cobalt hydroxide to metallic cobalt with hydrogen at a temperature of from about 400 to about 600° F., and
   (e) lowering the temperature for hydrogenating said Oxo reaction carbonyl product stream sufficient to lower the paraffination and other side reactions below said undesirable level.

References Cited

UNITED STATES PATENTS

| 2,760,994 | 8/1956 | Gwynn. |
| 3,182,090 | 5/1965 | Mertzweiller et al. |
| 3,194,843 | 7/1965 | Silber et al. _____ 260—621 |
| 3,220,957 | 11/1965 | Hoff et al. |

PATRICK P. GARVIN, *Primary Examiner.*

U.S. Cl. X.R.

260—638